United States Patent Office 3,549,320
Patented Dec. 22, 1970

---

3,549,320
REGENERATION OF ACID
Charles Levi Isbell, Jr., Charleston, W. Va., assignor to
E. I. du Pont de Nemours and Company, Wilmington,
Del., a corporation of Delaware
No Drawing. Original application Mar. 3, 1964, Ser. No.
349,536. Divided and this application Feb. 6, 1968, Ser.
No. 724,303
Int. Cl. C01b *17/92*
U.S. Cl. 23—168            3 Claims

ABSTRACT OF THE DISCLOSURE

This invention relates to a cyclic process for the production of methyl methacrylate by the reaction of acetone cyanohydrin with sulfuric acid and methanol in which sulfuric acid is regenerated from a waste stream containing ammonium sulfate and recycled for reaction with additional acetone cyanohydrin.

---

This application is a division of application Ser. No. 349,536, filed Mar. 3, 1964.

It is known in the art to produce methyl methacrylate from acetone cyanohydrin by reacting acetone cyanohydrin with fuming sulfuric acid and methanol. See U.S. Pats. 2,042,458, issued June 2, 1936 to Crawford and 2,416,756, issued Mar. 7, 1947 to Jilk. By-products of this reaction include ammonium sulfate and ammonium hydrogen sulfate. These by-products have only limited commercial value as obtained, and present a disposal problem which adversely affects economics of the overall process. Thus, the by-products of this process have not been desirable. Ammonium sulfate has not been acceptable as a raw material for the production of sulfuric acid because the ammonium tends to recombine with the sulfate resulting in low yields of $SO_2$. Furthermore, the ammonium sulfate tends to form nitric oxides and these products are absorbed during the absorption of $SO_3$ thus resulting in an impure product.

It is an object of this invention to provide a process for the production of methyl methacrylate in which the sulfuric acid is regenerated and again reacted with acetone cyanohydrin. It is a further object of this invention to provide a process for the production of methyl methacrylate without formation of pollution forming by-products. It is a further object of this invention to provide a use for sulfuric acid containing small amounts of nitric acid. It is a further object of this invention to provide a process for the production of sulfuric acid from ammonium sulfate containing materials in which the sulfuric acid is recovered at high yields. Other objects will be apparent to one skilled in the art from the remainder of the specification.

The above objects are accomplished and the above difficulties are overcome according to the present invention by reacting substantially pure acetone cyanohydrin with sulfuric acid, which reaction includes the formation of methacrylamide sulfate according to the following equation:

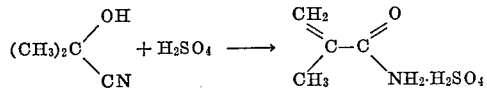

The reaction product is then reacted with methanol and water which reaction includes the formation of methyl methacrylate according to the following equation:

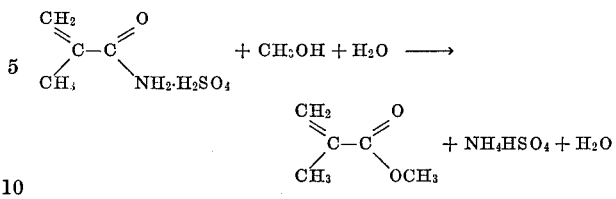

Other compounds present in the resulting mixture include $H_2SO_4$, $(NH_4)_2SO_4$, water, $C_3H_4O(NH_4SO_3)_2$ and organics having the empirical formula $C_5H_{10}O_3$.

The methyl methacrylate is then separated from the mixture by distillation, and the ammonium hydrogen sulfate containing portion is burned. The products resulting from the burning include $CO_2$, $O_2$, $H_2O$, $SO_2$, $N_2$, oxides of nitrogen, and $SO_3$. This effluent gas is then dried, heated and then passed over a catalyst in the presence of added amounts of oxygen. The $SO_2$ is oxidized to $SO_3$, and the $SO_3$ is removed from the gas by absorption with concentrated sulfuric acid forming fuming sulfuric acid (oleum). This absorption may take place using various techniques, such as a surface-type absorber in which the gas containing the $SO_3$ is passed countercurrently over the surface of a stream of concentrated sulfuric acid, or using a bubbling type absorber in which the gas containing $SO_3$ is bubbled through concentrated sulfuric acid, or using a packed absorption tower in which the gas containing the $SO_3$ is passed up through an absorption tower and concentrated sulfuric acid is passed down through the absorption tower. The concentration of the fuming sulfuric acid is then adjusted to form 6% fuming sulfuric acid, and the 6% fuming sulfuric acid is reacted with additional acetone cyanohydrin.

The burning of the ammonium sulfate containing mixture must be controlled within a relatively narrow range in order to assure a high yield of sulfuric acid. Specifically, the temperature must be within the range of 850° C. to 1150° C., preferably 950° C. to 1050° C. The reaction of ammonium sulfate is thought to be essentially thermal cracking, and at this temperature the formation of $SO_2$ is favored. In a preferred embodiment, the mixture is sprayed into a furnace and burned to form $SO_2$. The furnace may be fired with carbon, as in coal, or hydrocarbon gas, such as natural gas; in any event, the resulting product includes CO and $CO_2$. The burning of the ammonium sulfate results in the oxidation of the ammonium ion, $NH_4^+$, to $N_2$, and oxides of nitrogen. When operating under the preferred conditions of the process, the greatest portion of the nitrogen is present as $N_2$ which is not readily oxidized in the oxidation of $SO_2$ to $SO_3$ and is thus ultimately vented as $N_2$.

After the ammonium sulfate containing mixture has been burned to form a gaseous mixture containing $SO_2$, the gaseous mixture is cooled sufficiently to condense most of the water (usually less than 40° C.), and scrubbed to remove the water, undecomposed sulfuric acid and ash, heated to between 300 and 500° C., and is then passed over a catalyst. Platinum containing catalysts are operative, but vanadium containing catalysts are preferred since they are less readily poisoned, and because they are not as reactive with nitrogen and thus minimize the amount of $N_2$ that is oxidized. The oxidation of $SO_2$ to $SO_3$ is preferably carried out by passing the gas through a catalyst bed at a temperature of about 400 to 600° C. The formation of $SO_3$ from $SO_2$ is exothermic, and a suitable heat exchange unit can be employed using this heat of reaction to preheat the incoming gas; of course, the heat can be supplied from another source.

Oxygen should be added to the gaseous mixture in an amount about 100 to 200% in excess on a molar basis of that stoichiometrically necessary to react with the $SO_2$ and form $SO_3$.

The gas is then cooled and the $SO_3$ absorbed with concentrated sulfuric acid, usually to a temperature less than 300° C. to form fuming sulfuric acid (oleum) having an $SO_3$ concentration of greater than 6%. This is diluted with water or weak acid to form about 6% fuming sulfuric acid (oleum), and this 6% fuming sulfuric acid is used to react with acetone cyanohydrin and alcohol with the formation of methyl methacrylate and ammonium sulfate.

After the $SO_3$ is absorbed from the gas, the remainder of the gas is vented.

In the following examples which illustrate the invention, all parts and percentages are by weight unless otherwise specified.

EXAMPLE I 400 parts acetone cyanohydrin was slowly added to 610 parts of 6% oleum. The temperature was allowed to rise to 100° C. After the addition was completed, the mixture was heated to 115° C. for an hour. 10 parts tannic acid were then added to inhibit polymerization. 320 parts methanol and 170 parts water were then added to the mixture, and the mixture was heated to 100° C.; the vapor produced was fractionated to separate and recover methyl methacrylate and methanol. After the vapor ceased to contain appreciable amounts of methyl methacrylate, the residue was removed, diluted with sufficient water to prevent crystallization, and analyzed. The residue, after dilution, contained 36.8% $H_2SO_4$, 29.0% water, 24.2% $(NH_4)_2SO_4$, 8.5% $C_3H_4O(NH_4SO_3)_2$ and 1.5% organics having the empirical formula $C_5H_{10}O_3$. (The method of analysis was such that $NH_4HSO_4$ was measured as partly $H_2SO_4$ and partly $(NH_4)_2SO_4$.) This diluted residue was then introduced into a gas fired burner at the base of the flame and sprayed upward at a rate of 12.0 cc./minute under 150 lbs./in.² pressure with natural gas at a rate of 1250 cc./minute and air at a rate of 17,000 cc./minute.

The effluent gas was then cooled to 32° C. and scrubbed to remove water, undecomposed sulfuric acid, and ash, and the resulting gas had the following analysis:

| | Mole percent |
|---|---|
| $O_2$ | 3.0 |
| $SO_2$ | 8.8 |
| $CO_2$ | 9.1 |
| $N_2$ | 79.1 |

Nitrogen oxides as $NO_2$—50 parts per million.

The gas was then heated to 440° C. by passing through heating coils and then passing through a canadium pentoxide catalytic bed containing 4 litre of catalyst at a rate of 106,800 cc./minute. The catalyst was preheated to 540° C. by circulation of heated air through the bed. Air was introduced at a rate of 14,760 cc./minute. The resulting gas had the following analysis:

| | Mole percent |
|---|---|
| $SO_2$ | 0.3 |
| $SO_3$ | 6.5 |
| $O_2$ | 4.5 |
| $N_2$ | 82.7 |
| $CO_2$ | 6.5 |

Nitrogen oxides as $NO_2$—40 parts per million.

This gas was cooled to 200° C. and then the $SO_3$ absorbed with concentrated sulfuric acid by passing the gas at the rate of 97,800 cc./minute through a series of absorption towers packed with graded quartz. The gas had the following analysis on completion of this treatment:

$SO_2$—0.3 mole percent
$SO_3$—0.001 milligram per cc.
$O_2$—4.8 mole percent
$N_2$—88.0 mole percent
$CO_2$—6.9 mole percent Nitrogen oxides as $NO_2$—20 parts per million.

20% oleum containing small amounts of $HNO_3$ was recovered. This was diluted with water to form a 6% oleum solution, and this material was recycled for reaction with acetone cyanohydrin.

EXAMPLE II 400 parts acetone cyanohydrin was slowly added to 610 parts of 6% oleum. The temperature was allowed to rise to 100° C. After the addition was completed, the mixture was heated to 115° C. for an hour. 10 parts tannic acid was then added to inhibit polymerization. 320 parts methanol and 180 parts water were then added to the mixture, and the mixture was heated to 100° C.; the vapor produced was fractionated to separate and recover methyl methacrylate and methanol. After the vapor ceased to contain appreciable amounts of methyl methacrylate, the residue was removed, diluted with sufficient water to prevent crystallization, and analyzed. The residue, after dilution, contained 35.8% $H_2SO_4$, 30.8% water, 23.5% $(NH_4)_2SO_4$, 8.4% $C_3H_4O(NH_4SO_3)_2$, and 1.5% organics having the empirical formula $C_5H_{10}O_3$. (The method of analysis was such that $NH_4HSO_4$ was measured as partly $H_2SO_4$ and partly $(NH_4)_2SO_4$.) This diluted residue was then introduced into a gas fired furnace above the burner flame and sprayed downward at a rate of 4360 lb./hr. under a pressure of 120 lbs./in.² with natural gas at a rate of 8700 standard cubic feet/hr. and air at a rate of 150,000 standard cubic feet/hr.

The gas was then cooled to 40° C. and scrubbed to remove water, undecomposed sulfuric acid, and ash. The resulting gas had the following analysis:

| | Mole percent |
|---|---|
| $SO_2$ | 6.0 |
| $CO_2$ | 9.9 |
| $O_2$ | 3.1 |
| $N_2$ | 81.0 |

Nitrogen oxides as $NO_2$—40 parts per million.

The gas was then heated to 440° C. by passing through heating coils and then passing through a platinum catalytic bed containing 870 Troy ounces of catalyst at a rate of 431,000 cubic feet/hour. The platinum bed was preheated to about 500° C. by circulation of heated air through the bed. Air was introduced at a rate of 33,600 standard cubic feet/hour. The resulting gas had the following analysis:

| | Mole percent |
|---|---|
| $SO_2$ | 0.2 |
| $SO_3$ | 4.9 |
| $CO_2$ | 8.5 |
| $O_2$ | 3.5 |
| $N_2$ | 82.9 |

Nitrogen oxides as $NO_2$—35 parts per million.

This gas was then cooled to 225° C. and the $SO_3$ absorbed with concentrated sulfuric acid by passing the gas at the rate of 361,700 cubic feet per hour through a series of porcelain packed absorption towers. The gas had the following analysis on completion of this treatment:

$SO_2$—0.3 mole percent
$O_2$—3.7 mole percent
$CO_2$—8.9 mole percent
$N_2$—87.1 mole percent
$SO_3$—30 milligrams/cubic foot Nitrogen oxides as $NO_2$—30 parts/million.

20% oleum containing small amounts of $HNO_3$ was recovered. This was diluted with water to form a 6% oleum solution, and this material was recycled for reaction with acetone cyanohydrin.

I claim:
1. A process for the preparation of sulfuric acid from residues of methyl methacrylate production containing ammonium sulfate, which comprises burning the residues containing ammonium sulfate to produce a gas containing sulfur dioxide and nitrogen, oxidizing the sulfur dioxide to form sulfur trioxide, absorbing the sulfur trioxide with concentrated sulfuric acid to form oleum.
2. A process for the preparation of sulfuric acid from the residues obtained from the production of methyl methacrylate, which residues contain ammonium sulfate, which comprises burning said residues at a temperature within the range of 850° C. to 1150° C. to form a gas containing sulfur dioxide, oxidizing said sulfur dioxide to form sulfur trioxide by passing the gas containing said sulfur dioxide over an oxidizing catalyst in the presence of oxygen at a temperature within the range 400 to 600° C., said oxygen being present in the amount of between 100 and 200% in excess, on a molar basis, of that stoichiometrically necessary to react with sulfur dioxide, absorbing the sulfur trioxide with concentrated sulfuric acid to form fuming sulfuric acid.
3. The process of claim 2 in which the catalyst is selected from the class consisting of platinum and vanadium containing catalysts.

References Cited
UNITED STATES PATENTS

| | | | |
|---|---|---|---|
| 2,038,429 | 4/1936 | Hechenbleikner | 23—173 |
| 2,406,930 | 9/1946 | Titlestad | 23—172 |
| 2,739,039 | 3/1956 | Phelps | 23—129 |
| 3,275,407 | 9/1966 | Furkert | 23—178 |
| 3,282,646 | 11/1966 | Bonfield et al. | 23—177 |

OSCAR R. VERTIZ, Primary Examiner

G. O. PETERS, Assistant Examiner

U.S. Cl. X.R.

23—178